US008267324B2

(12) United States Patent
Sbuell et al.

(10) Patent No.: US 8,267,324 B2
(45) Date of Patent: Sep. 18, 2012

(54) ANTENNA INTERFACE HAVING A PAUSE DETECTOR

(75) Inventors: Richard Sbuell, Graz (AT); Albert Missoni, Graz (AT); Walter Kargl, Graz (AT)

(73) Assignee: Infineon Technologies AG, Neubiberg (DE)

( * ) Notice: Subject to any disclaimer, the term of this patent is extended or adjusted under 35 U.S.C. 154(b) by 599 days.

(21) Appl. No.: 12/481,930

(22) Filed: Jun. 10, 2009

(65) Prior Publication Data

US 2010/0314444 A1 Dec. 16, 2010

(51) Int. Cl.
*G06K 19/06* (2006.01)

(52) U.S. Cl. .................................... 235/492; 340/572.7

(58) Field of Classification Search .................. 235/492; 340/572.7, 572.8; 342/175
See application file for complete search history.

(56) References Cited

U.S. PATENT DOCUMENTS

| | | | | |
|---|---|---|---|---|
| 6,392,450 | B2 * | 5/2002 | Yoshida et al. | 327/72 |
| 7,868,481 | B2 * | 1/2011 | Sbuell et al. | 307/66 |
| 2001/0039617 | A1 * | 11/2001 | Buhrlen et al. | 713/185 |
| 2003/0022691 | A1 * | 1/2003 | Seki | 455/560 |
| 2006/0091213 | A1 * | 5/2006 | Bui et al. | 235/451 |

* cited by examiner

*Primary Examiner* — Ahshik Kim
(74) *Attorney, Agent, or Firm* — Dickstein Shapiro LLP

(57) ABSTRACT

An antenna interface of a contactless device including a current source configured to provide a current signal which is dependent on a radio frequency field; and a pause detector coupled to the current source and configured to detect a field pause from the current signal and output a field pause signal.

20 Claims, 4 Drawing Sheets

ANTENNA INTERFACE HAVING A PAUSE DETECTOR

BACKGROUND

The present invention is directed to the integration of a pause detector in an antenna interface of a contactless device.

The basic components of a contactless card system are a contactless reader and the contactless card. The contactless reader, also known as a PCD, includes an antenna electrically coupled to an electronic circuit. The contactless card, also known as a smart card, a tag, a PICC, or an RFID tag, has an inductive antenna and an integrated circuit electrically coupled to the inductive antenna.

When the contactless card penetrates a transmission field of the reader, the reader antenna transmits to the contactless card a carrier signal, which generates a radio frequency (RF) field to supply the contactless card with power and data, which is achieved by amplitude modulation of the carrier signal. In return, the contactless card transmits data by load modulating the carrier signal. This load modulated signal is detected by the reader antenna. The communication between the reader and the contactless card may be defined by any of numerous ISO (International Organization for Standardization) standards, such as 14443 Type A/B/C, 15693, 18000, etc.

The ISO 14443 Type A communication protocol uses amplitude-shift keying (ASK) with a reader to contactless card modulation index of up to 100%. A single bit of data is coded as a pause in the transmission. During the pause, the carrier field emitted by the reader antenna is reduced by the modulation index. At a modulation index of 100%, the carrier field is therefore turned off during a pause, which can last several microseconds.

A conventional contactless card detects a field pause using a demodulator located separately from the contactless card antenna interface. The modulated carrier signal received by the contactless card is rectified and low-pass-filtered. The low-pass-filtered signal is then provided to a comparator circuit which generates a signal indicating the presence of a field pause.

DETAILED DESCRIPTION

Figure 1:
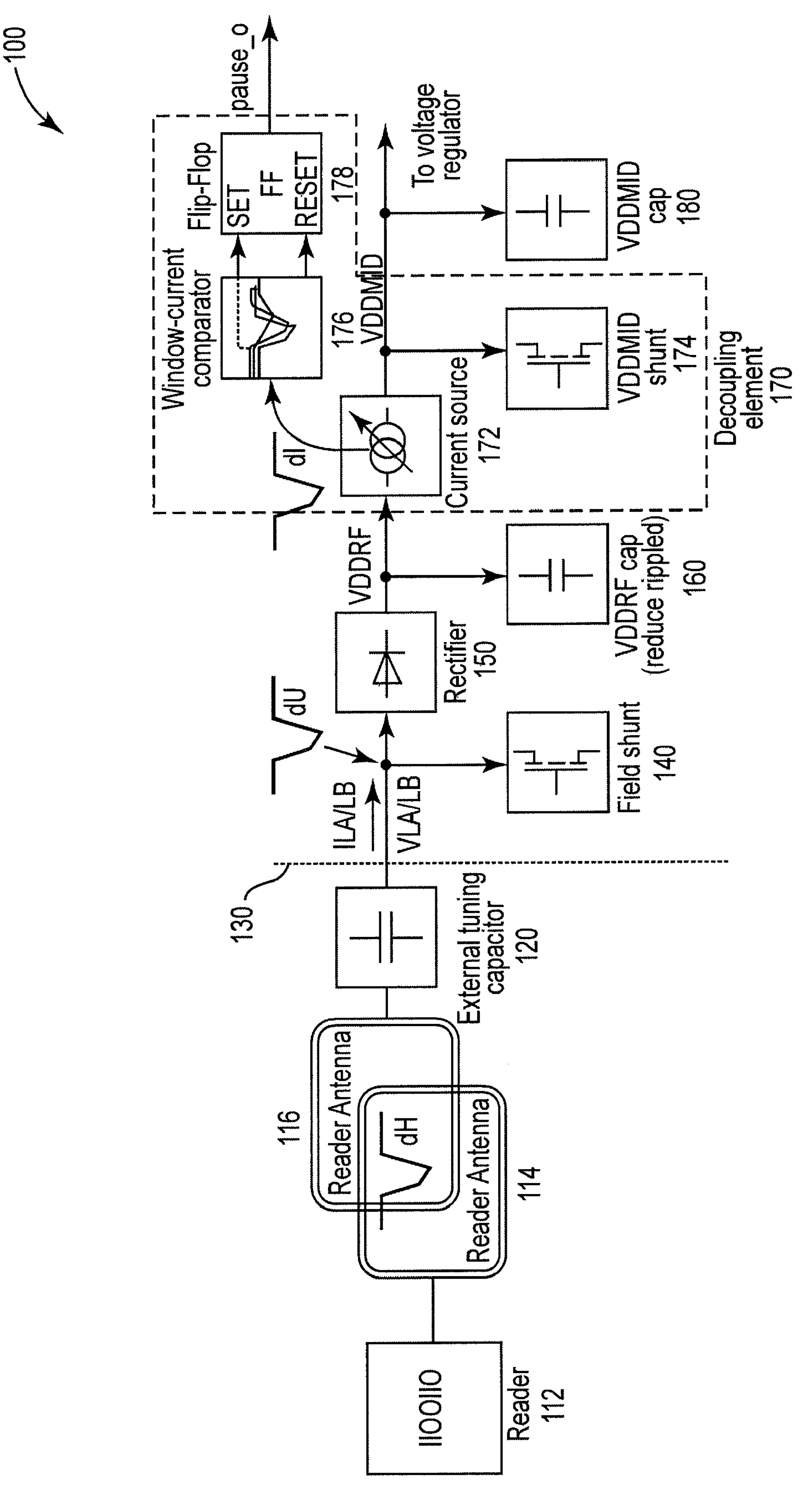
FIG. 1 is a circuit diagram of a contactless system having a contactless card including a pause detector integrated into its chip-load independent antenna interface in accordance with an exemplary embodiment.

FIG. 1 is a circuit diagram of a contactless system 100 having a reader and a contactless card including a pause detector integrated into its chip-load independent antenna interface in accordance with an exemplary embodiment. As shown, reader 112 includes reader antenna 114, and contactless card includes card antenna 116, external tuning capacitor 120, and an antenna interface, which includes circuit components to the right of line 130.

When the contactless card penetrates a transmission field of reader 112, the card antenna 116 detects a carrier signal transmitted via reader antenna 114. The carrier signal induces a current in card antenna 116 and thereby supplies the contactless card with data and power. Card antenna 116 is tuned by an external tuning capacitor 120 to a voltage at node VLA/LB.

Field shunt 140 may be provided to limit the voltage at node VLA/LB and is coupled between node VLA/LB and ground. Rectifier 150 converts the analog antenna current ILA/LB passing through node VLA/LB into a unidirectional current at node VDDRF. VDDRF capacitor 160 may be provided to reduce the ripple of the voltage at node VDDRF, and is coupled between node VDDRF and ground.

Decoupling element 170 includes current source 172, VDDMID shunt transistor 174, window-current comparator 176, and flip-flop 178. Current source 172 supplies current to a voltage regulator (not shown), and is coupled between node VDDRF and node VDDMID. The voltage regulator supplies the internal circuitry of the contactless card with an internal power supply voltage. At node VDDMID, VDDMID shunt transistor 174 may be provided to limit the internal supply voltage and VDDMID capacitor 180 may be provided to reduce ripple in this internal power supply voltage.

The current through current source 172 is basically a constant current and is dependent on the radio frequency field received by the card antenna 116. Amplitude modulation by reader antenna 114 causes a variation of the field strength received by contactless card antenna 116 and consequently a variation of the current through current source 172. In a weak field case, the contactless card does not receive much energy, and the current through current source 172 is small. In a strong field case, the contactless card receives more energy, and the current through current source 172 is increased.

When there is a field pause, reader 112 stops modulating, and the field strength radiated by reader antenna 114 decreases. The field received at card antenna 116 decreases due to the transmission field of the reader antenna 114 decreasing, and thus the received field for the card antenna 116 also decreases by a corresponding amount. Therefore, the energy supply received by the contactless card also decreases, antenna voltage VLA/LB decreases by voltage level dU, and due to reduction of chip voltage dU during the field pause, the current through current source 172 also decreases by an amount dI.

In addition to supplying current to the voltage regulator, the current from current source 172 is used to obtain a current window for window-current comparator 176. As will be explained in more detail below, window-current comparator 176 compares the current from current source 172 with upper and lower threshold current levels to determine the start and end of a field pause. Based on this comparison, window-current comparator 176 outputs set and reset signals to flip-flop 178, and the output of flip-flop 178 is the pause signal pause_o.

Figure 2:
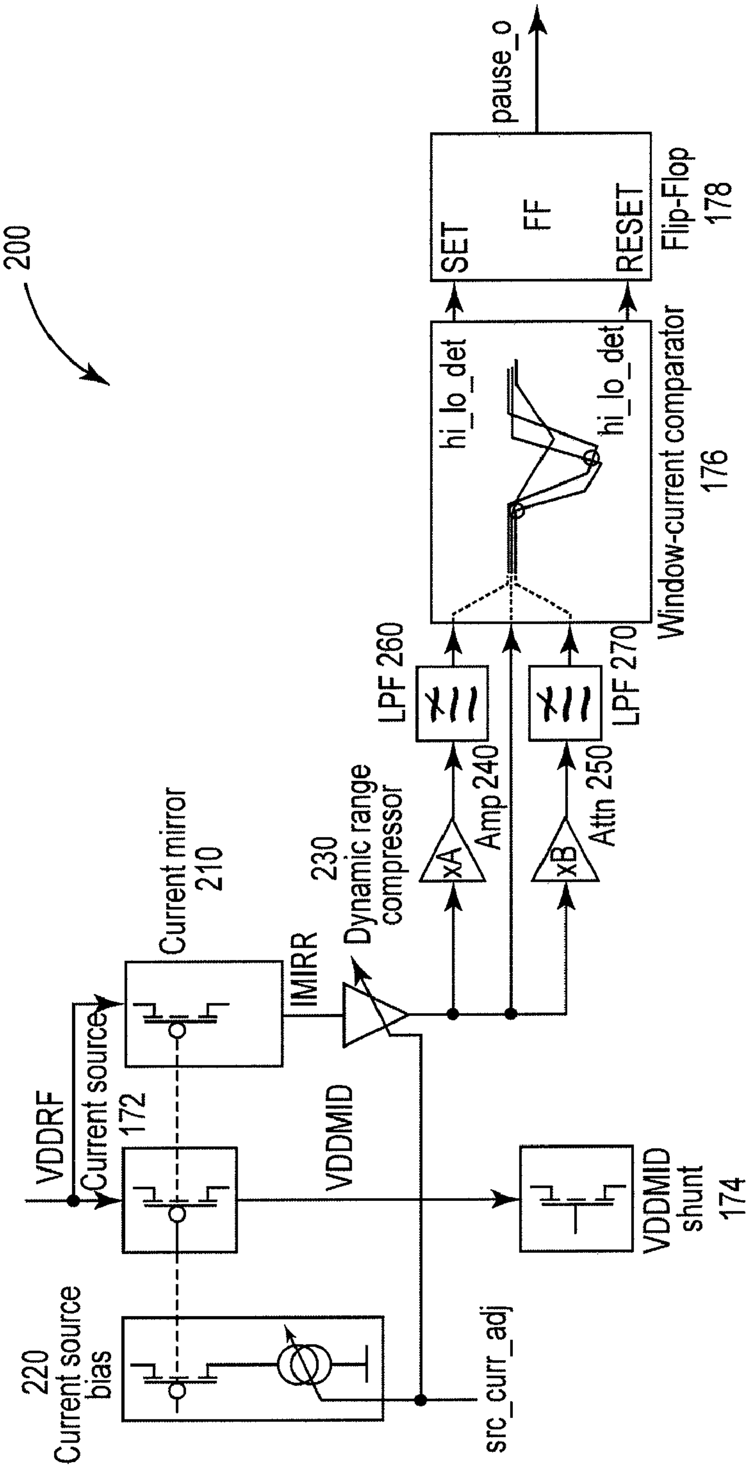
FIG. 2 is a circuit diagram of a portion of a contactless card having a pause detector integrated into its antenna interface in accordance with an exemplary embodiment.

FIG. 2 is a circuit diagram of a portion of a contactless card having a pause detector integrated in to its antenna interface in accordance with an exemplary embodiment.

As discussed above, the current through current source 172 is dependent on the field received by card antenna 116. The current change in current source 172 is mirrored via current mirror 210 to provide mirror current IMIRR. Source current adjust signal src_curr_adj is used to adjust the current through current source 172 via a current sink, which defines currents through current source bias 220, and this bias current is mirrored to current source 172. Source current adjust signal src_curr_adj is adapted to the field strength by a regulation loop (not shown).

The current through current source 172 is not large, but the dynamic range can vary significantly. Dynamic range compressor 230 can therefore be provided to attenuate mirrored current IMIRR when the current from current source 172 is large to thereby maintain a low current consumption of the window-current comparator 176. The output current of dynamic range compressor 230 provided to amplifier 240 and attenuator 250 should remain at, for example, about 1 μA, independent of field strength. In addition to using source current adjust signal src_curr_adj to adjust the current through current source 172, it is additionally used to configure dynamic range compressor 230. A strong field and strong source current result in maximum dynamic range compression; a weak field and small current source current result in minimal dynamic range compression.

The dynamically compressed current output by dynamic range compressor 230 is amplified by a factor A using amplifier 240, and then low pass filtered and slowed down slightly by low pass filter 260. This amplified, filtered signal defines the upper threshold current level of the current window. Also, the dynamically compressed current is attenuated by a factor B using attenuator 250, and then low pass filtered and slowed down significantly by low pass filter 270. This attenuated, filtered signal defines the lower threshold current level of the current window. The size of the current window in window-current comparator 176 equals A–B, and depends on, for example, data type and baud rate.

Window-current comparator 176 compares the unfiltered dynamically compressed current signal with each of the amplified and attenuated current signals to determine a start of a field pause and then an end of the field pause. The unfiltered current signal is directly dependent from the current in current source 172. A start of a field pause is detected when the unfiltered current signal crosses the lower threshold current level, that is the attenuated, filtered current signal, and in such a case, window-current comparator 176 outputs a set signal at output hi_lo_det. Conversely, an end of the field pause is detected when the unfiltered current signal crosses the upper threshold current level, that is the amplified, filtered current signal, and in such a case, window-current comparator 176 outputs a reset signal from output lo_hi_det. Flip-flop 178 is provided to maintain the state of the field pause detection. The set signal output from output hi_lo_det is used to set flip-flop 178, and the reset signal output from output lo_hi_det is used to reset flip-flip 178. The output of flip-flop 178 is the pause signal pause_o. It should be appreciated that the invention is not limited to a flip-flip 178. Any device capable of maintaining the state of the field pause detection may alternatively be used.

As mentioned above, the amplified current signal is slowed down by low pass filter 260 slightly, whereas the attenuated current signal is slowed down by low pass filter 270 significantly. The speed of the unfiltered current signal, which is directly output from dynamically range compressor 230, is not changed, and thus is as fast as the current change in the unfiltered current signal of current source 172. The speeds of the amplified and attenuated signals are adjusted so that the unfiltered current signal crosses the amplified current signal and the attenuated current signal at the proper points to detect the start and end of field pauses accurately. The values of amplifier 240, low pass filter 260, attenuator 250, and low pass filter 270 are all adjustable and are specific to the particular environment and design of the contactless card.

Figure 3:
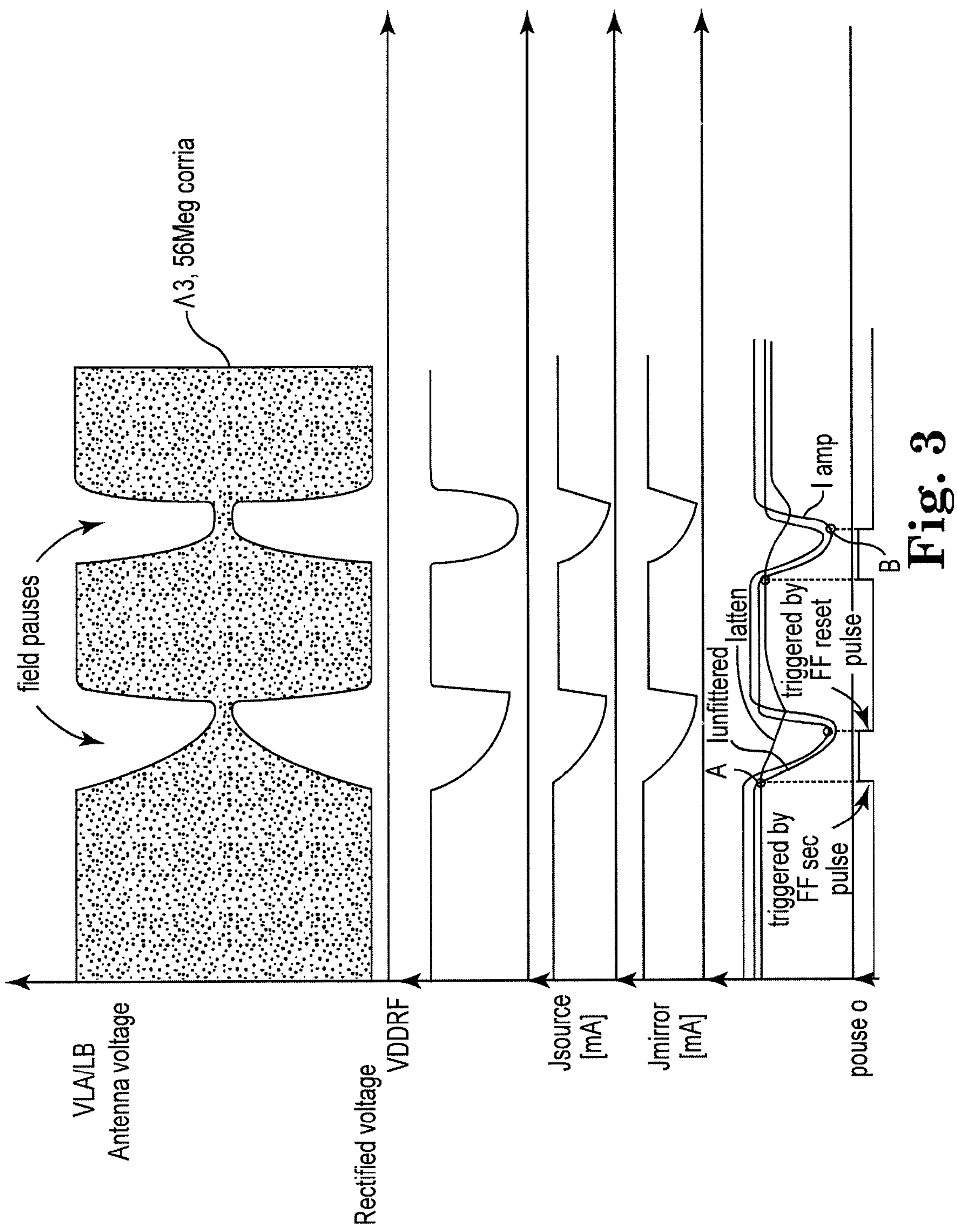
FIG. 3 shows a timing diagram in accordance with an exemplary embodiment.

FIG. 3 shows a timing diagram according to an embodiment of the invention. More specifically, FIG. 3 shows the timing of the antenna voltage VLA/LB, the rectified voltage VDDRF, the current source current Isource, the mirrored, dynamically compressed source current Imirror, and the field pause signal pause_o.

As shown, the carrier signal induces an antenna voltage VLA/VB at card antenna 116. The carrier signal shown is in accordance with ISO 14443 Type A in that there are periodic field pauses. It should be understood, however, that the invention is not limited to Type A transmissions. The invention is applicable to the transmission of any standard involving a field pause.

As explained above, when there is a field pause, the reader stops modulating and the received field strength decreases, resulting in a decrease in antenna voltage VLA/LB. It then follows that rectified voltage VDDRF, current source current Isource, and mirrored current Imirror (or IMIRR) also decrease.

At the falling edge of a field pause, that is a pause start, the unfiltered current signal Iunfiltered intersects with the attenuated current signal Iatten, at point A, causing window-current comparator 176 to output a set signal from output hi_lo_det. The set signal sets flip-flop circuit 178 and triggers a rise in pause signal pause_o. At the rising edge of a field pause, that is the pause end, the unfiltered current signal Iunfiltered intersects with the amplified current signal Iamp at point B, causing window-current comparator 176 to output a reset signal from output lo_hi_det. The reset signal resets flip-flop circuit 178 and triggers a fall in pause signal pause_o.

Figure 4:
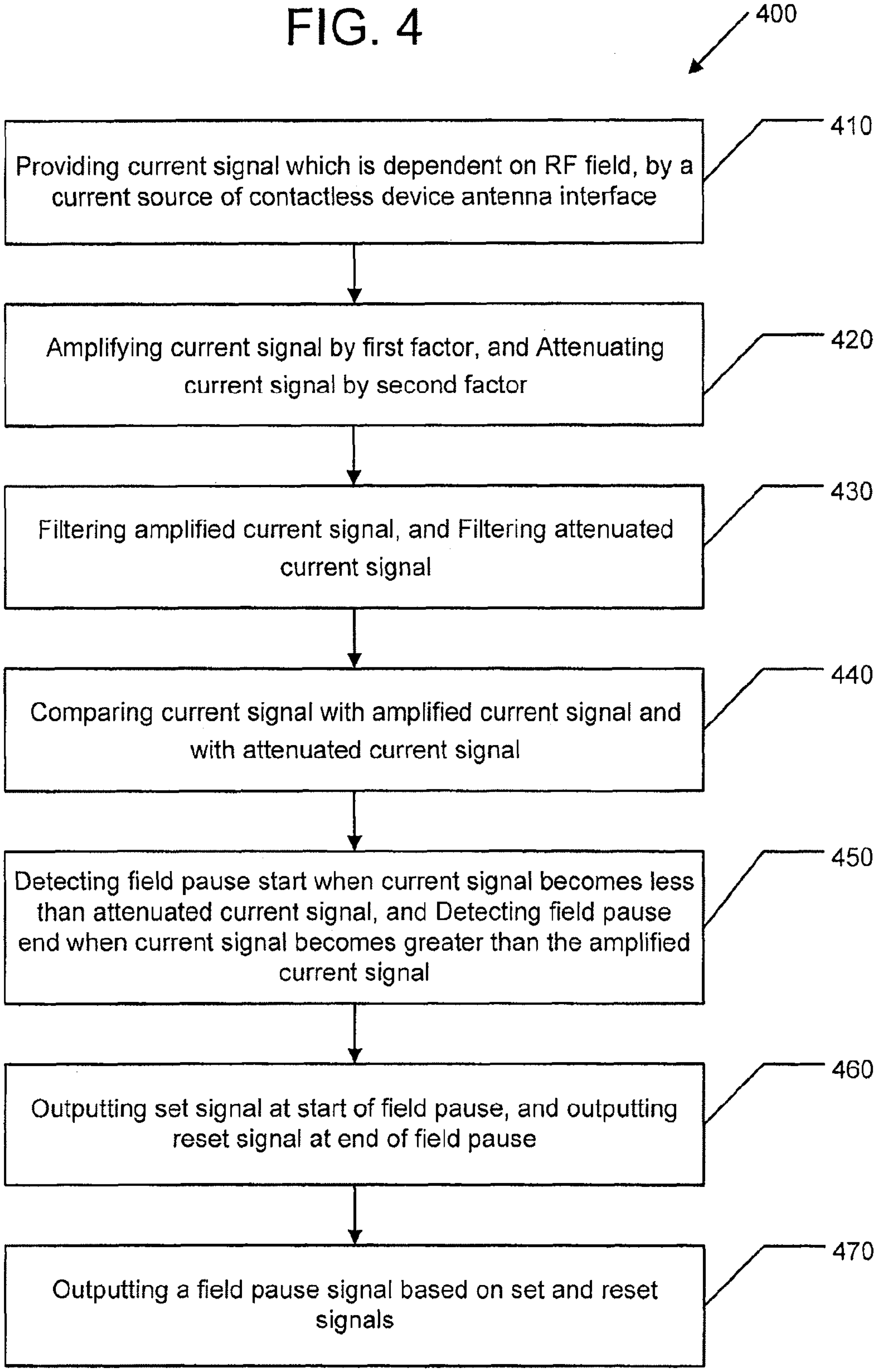
FIG. 4 shows a flowchart of a method for detecting a field pause signal in accordance with an exemplary embodiment.

FIG. 4 shows a flowchart 400 of a method for detecting a field pause signal in accordance with an exemplary embodiment. At Step 410, a current signal Isource which is dependent on a radio frequency field is provided by current source 172 of an antenna interface of a contactless device. Then, at Step 420, amplifier 240 amplifies the current signal by a first factor A, and attenuator 250 attenuates the current signal by a second factor B. At Step 430, both the amplified current signal is filtered by low pass filter 260 to slow down the amplified current signal, and the attenuated current signal is filtered using low pass filter 270 to slow down the attenuated signal more than the amplified current signal.

At Step 440, the unfiltered current signal Iunfiltered is compared with each of the amplified current signal Iamp and the attenuated current signal Iatten. Then, at Step 450, a start of a field pause is detected when the unfiltered current signal Iunfiltered becomes less than the attenuated current signal Iatten, and an end of a field pause is detected when the unfiltered current signal Iunfiltered becomes greater than the amplified current signal Iamp. At Step 460, a set signal is output at the start of the field pause, and a reset signal is output at the end of the field pause. Finally, at Step 470, a field pause signal pause_o is output based on the set signal and the reset signal.

The integration of the pause detector within the chip load independent antenna interface of the contactless card results in a chip having reduced area.

While the invention has been described in terms of ISO 14443 Type A demodulation, the invention is not limited in this respect. The invention is applicable to any type of demodulation involving a field pause.

Also, the invention is not limited to the contactless device being in the form of a card. The device may be in any form suitable for the intended purpose.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An antenna interface of a contactless device, comprising:

a current source configured to provide a current signal which is dependent on a radio frequency field; and a pause detector comprising a window-current comparator, coupled to the current source, and configured to detect a field pause from the current signal and output a field pause signal.

2. The antenna interface of claim 1, wherein the pause detector further comprises:

an amplifier coupled between the current source and the window-current comparator, and configured to amplify the current signal by a first factor; and an attenuator coupled between the current source and the window-current comparator, and configured to attenuate the current signal by a second factor.

3. The antenna interface of claim 2, wherein the window-current comparator is configured to compare the current signal with the amplified current signal and with the attenuated current signal.

4. The antenna interface of claim 3, wherein the window-current comparator is further configured to detect a start of a field pause when the current signal becomes less than the attenuated current signal, and to detect an end of a field pause when the current signal becomes greater than the amplified current signal.

5. The antenna interface of claim 4, wherein the window-current comparator is further configured to output a set signal at the start of the field pause, and to output a reset signal at the end of the field pause.

6. The antenna interface of claim 5, wherein the pause detector further comprises a flip-flop coupled to the window-current comparator and configured to output a field pause signal based on the set and reset signals.

7. The antenna interface of claim 2, wherein the pause detector further comprises:

a first filter coupled between the amplifier and the window-current comparator, and configured to slow down the amplified current signal; and a second filter coupled between the attenuator and the window-current comparator, and configured to slow down the attenuated current signal more than the amplified current signal.

8. The antenna interface of claim 2, further comprising a current mirror coupled to the current source and configured to mirror the current signal.

9. The antenna interface of claim 8, further comprising a dynamic range compressor coupled between the current mirror and each of the amplifier and attenuator, and configured to dynamically compress the mirrored current signal.

10. The antenna interface of claim 9, further comprising a current source bias coupled to the current source and the dynamic range compressor, and configured to output a bias current signal, wherein the dynamic range compressor dynamically compresses the mirrored current signal.

11. A contactless device comprising:

an antenna; and an antenna interface coupled to the antenna and comprising:

a current source configured to provide a current signal which is dependent on a radio frequency field received at the antenna; and a pause detector comprising a window-current comparator, coupled to the current source, and configured to detect a field pause from the current signal and output a field pause signal.

12. The contactless device of claim 11, wherein the contactless device is a contactless card.

13. A method for detecting a field pause signal, the method comprising:

providing a current signal which is dependent on a radio frequency field, by a current source of an antenna interface of a contactless device; and detecting a field pause from the current signal, by a pause detector comprising a window-current comparator; and outputting a field pause signal.

14. The method of claim 13, wherein the detecting step comprises:

amplifying the current signal by a first factor;

attenuating the current signal by a second factor;

comparing the current signal with the amplified current signal and with the attenuated current signal; and detecting a start of a field pause when the current signal becomes less than the attenuated current signal, and detecting an end of a field pause when the current signal becomes greater than the amplified current signal.

15. The method of claim 14, wherein the detecting step further comprises outputting a set signal at the start of the field pause, and outputting a reset signal at the end of the field pause.

16. The method of claim 14, wherein the detecting step further comprises:

slowing down the amplified current signal; and slowing down the attenuated current signal more than the amplified current signal.

17. The method of claim 14, further comprising mirroring the current signal.

18. The method of claim 17, further comprising dynamically compressing the mirrored current signal prior to the amplification and attenuation steps.

19. A contactless communication system comprising:

a contactless reader configured to output a carrier signal having a field pause; and a contactless card comprising:

an antenna; and an antenna interface coupled to the antenna and comprising:

a current source configured to provide a current signal which is dependent on a radio frequency field of the carrier signal; and a pause detector comprising a window-current comparator, coupled to the current source, and configured to detect the field pause from the current signal and output a field pause signal.

20. An antenna interface of a contactless device, comprising:

a current source means for providing a current signal which is dependent on a radio frequency field; and a pause detector means, comprising a window-current comparing means, for detecting a field pause from the current signal.

* * * * *